(12) United States Patent
Ahmed

(10) Patent No.: US 11,255,746 B2
(45) Date of Patent: Feb. 22, 2022

(54) PHOTONIC RESONATOR ANALYZER AND CHARACTERIZING A PHOTONIC RESONATOR

(71) Applicant: Government of the United States of America, as represented by the Secretary of Commerce, Gaithersburg, MD (US)

(72) Inventor: Zeeshan Ahmed, Washington, DC (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 0 days.

(21) Appl. No.: 17/113,222

(22) Filed: Dec. 7, 2020

(65) Prior Publication Data

US 2021/0172833 A1 Jun. 10, 2021

Related U.S. Application Data

(60) Provisional application No. 62/944,463, filed on Dec. 6, 2019.

(51) Int. Cl.
*G01M 11/00* (2006.01)
*G02B 1/00* (2006.01)
(Continued)

(52) U.S. Cl.
CPC ............. *G01M 11/33* (2013.01); *G01K 11/32* (2013.01); *G02B 1/005* (2013.01); *H01P 7/00* (2013.01); *G02B 6/29338* (2013.01)

(58) Field of Classification Search
CPC .... G01M 11/08; G01M 11/088; G01M 11/30; G01M 11/33; G01M 11/331;
(Continued)

(56) References Cited

U.S. PATENT DOCUMENTS 7,352,466 B2 * 4/2008 Cao ...................... B82Y 20/00
356/437
9,726,553 B2 * 8/2017 Ahmed .................. G01K 11/00
(Continued)

FOREIGN PATENT DOCUMENTS

AU 2019100679 A4 * 8/2019

OTHER PUBLICATIONS

Lee, J-M., et al., "Temperature Dependence of Silicon Nanophotonic Ring Resonator With a Polymeric Overlayer", Journal of Lightwave Technology, 2007, p. 2236-2243, vol. 25 No 8.

*Primary Examiner* — Gordon J Stock, Jr.
(74) *Attorney, Agent, or Firm* — Office of Chief Counsel for National Institute of Standards and Technology

(57) ABSTRACT

A photonic resonator analyzer characterizes a photonic resonator and incudes a light source that provides a probe light; a photonic resonator that receives the probe light and produces product light; an optical detector that receives the product light and produces a product signal; a mode analyzer that receives the product signal and produces a resonator spectrum; and a spectral analyzer that receives the resonator spectrum, performs regression by fitting a non-parametric model to the resonator spectrum, and produces a thermal response function of the photonic resonator from fitting the non-parametric model to the resonator spectrum to characterize the photonic resonator.

2 Claims, 8 Drawing Sheets

(51) Int. Cl.
*G01K 11/32* (2021.01)
*H01P 7/00* (2006.01)
*G02B 6/293* (2006.01)

(58) Field of Classification Search
CPC ............. G01M 11/332; G01M 11/333; G01M 11/334; G01M 11/335; G01M 11/336; G01M 11/337; G01M 11/338; G01K 11/32; G01B 11/16; G01B 11/18; G02B 6/1225; G02B 6/4266; G02B 6/29338; G02B 6/2934; G02B 6/29341; G02B 6/29343; G02B 1/005; H01P 7/00; H01P 7/005; H01P 7/02; H01P 7/04; H01P 7/06; H01P 7/065; H01P 7/08; H01P 7/082; H01P 7/084; H01P 7/086; H01P 7/088; H01P 7/10; H01P 7/105
See application file for complete search history.

(56) References Cited

U.S. PATENT DOCUMENTS

| | | | | |
|---|---|---|---|---|
| 10,718,872 | B2* | 7/2020 | Tosh | G01T 1/12 |
| 10,782,421 | B2* | 9/2020 | Tosh | G01T 7/00 |
| 10,816,325 | B2* | 10/2020 | Ahmed | G01B 9/02008 |
| 10,935,370 | B2* | 3/2021 | Ahmed | G01B 11/16 |
| 10,955,617 | B2* | 3/2021 | Klimov | G02B 6/30 |
| 2006/0227331 | A1* | 10/2006 | Vollmer | G01N 21/39 |
| | | | | 356/483 |
| 2012/0044970 | A1* | 2/2012 | Arsenault | G01K 11/125 |
| | | | | 374/159 |
| 2017/0331550 | A1* | 11/2017 | Liu | G01J 3/0256 |

\* cited by examiner

PHOTONIC RESONATOR ANALYZER AND CHARACTERIZING A PHOTONIC RESONATOR

CROSS REFERENCE

This application claims priority to U.S. Provisional Patent Application Ser. No. 62/944,463, filed Dec. 6, 2019, the disclosure of which is incorporated herein by reference in its entirety.

STATEMENT REGARDING FEDERALLY SPONSORED RESEARCH

This invention was made with United States Government support from the National Institute of Standards and Technology (NIST), an agency of the United States Department of Commerce and The Government has certain rights in the invention. Licensing inquiries may be directed to the Technology Partnerships Office, NIST, Gaithersburg, Md., 20899; voice (301) 975-2573; email tpo@nist.gov.

BRIEF DESCRIPTION

Disclosed is a photonic resonator analyzer for characterizing a photonic resonator, the photonic resonator analyzer comprising: a light source that provides a probe light; a photonic resonator in optical communication with the light source and that receives the probe light from the light source and produces product light from the probe light; an optical detector in optical communication with the photonic resonator and that receives the product light from the photonic resonator and that produces a product signal from the product light; a mode analyzer in communication with the optical detector and that receives the product signal from the optical detector and produces a resonator spectrum from the product signal, the resonator spectrum comprising: a plurality of mode features, each mode feature individually comprising: a primary spline comprising a primary slope; a secondary spline comprising a secondary slope; and a mode peak spectrally interposed between the primary spline and the secondary spline; and a modal width that is a full width at half maximum of the mode feature from the primary spline to the secondary spline, such that mode peaks of adjacent mode features are spectrally separated by a mode distance and a spectrum valley; or a mode height that can be twice a distance from the mode peak to mode width; and a spectral analyzer in communication with the mode analyzer and that: receives the resonator spectrum from the mode analyzer; analyzes the resonator spectrum by: producing a modal kurtosis by normalizing the primary slope to the secondary slope; and producing a fringe visibility by normalizing the product square of mode height and mode peak to the modal width; producing time-state referenced parameters by normalizing all measurements of peak by measurement of peak at the first measurement of 200, creating time-state referenced parameters by normalizing all measurements of kurtosis by measurement of kurtosis at the first measurement of 200; creating time referenced parameters by normalizing all measurements of mode width by measurement of mode width at the first measurement of 200; and performs regression by: fitting a non-parametric model to the resonator spectrum, wherein the spectrum valley, the mode peak, primary spline, secondary spline, modal width, mode distance, primary slope, secondary slope, and modal kurtosis, state referenced peak, state referenced kurtosis, state referenced height, and time reference width are fitting parameters of the non-parametric model; and produces a thermal response function of the photonic resonator from fitting the non-parametric model to the resonator spectrum to characterize the photonic resonator.

Disclosed is a process for characterizing a photonic resonator, the process comprising: providing a photonic resonator; communicating a probe light from a light source, receiving, by the photonic resonator, the probe light; producing, by the photonic resonator, a product light from the probe light; communicating the product light from the photonic resonator to an optical detector; receiving, by the optical detector, the product light; producing, by the optical detector, a product signal; communicating the product signal from the optical detector to a mode analyzer; receiving, by the mode analyzer, the product signal; producing, by the mode analyzer, a resonator spectrum from the product signal, the resonator spectrum comprising: a plurality of mode features, each mode feature individually comprising: a primary spline comprising a primary slope; a secondary spline comprising a secondary slope; and a mode peak spectrally interposed between the primary spline and the secondary spline; and a modal width that is a full width at half maximum of the mode feature from the primary spline to the secondary spline, such that mode peaks of adjacent mode features are spectrally separated by a mode distance and a spectrum valley; analyzing the resonator spectrum by: producing a modal kurtosis by normalizing the primary slope to the secondary slope; producing a fringe visibility by normalizing the product of square of mode height and mode peak to the modal width; and performing regression by: fitting a non-parametric model to the resonator spectrum, wherein the spectrum valley, the mode peak, primary spline, secondary spline, modal width, mode distance, primary slope, secondary slope, and modal kurtosis are fitting parameters of the non-parametric model; and determining a thermal response function of the photonic resonator from fitting the non-parametric model to the resonator spectrum to characterize the photonic resonator.

BRIEF DESCRIPTION OF THE DRAWINGS

The following description should not be considered limiting in any way. With reference to the accompanying drawings, like elements are numbered alike.

FIG. 6 shows (a) temperature dependent spectra of device A at 20° C., 50° C. and 100° C. for eight modes from 1520 nm to 1570 nm; (b) a shift in mode frequency relative to mode frequency at 20° C. for dependence on temperature with differences between higher-order and lower-order mode; mode 5 shows a shoulder on the blue side that is labeled as mode m+5a;

DETAILED DESCRIPTION

A detailed description of one or more embodiments is presented herein by way of exemplification and not limitation.

It has been discovered that a photonic resonator analyzer 220 and process for characterizing a photonic resonator distinguish optical modes of a resonator based on characterization of a temperature sensitivity of a resonance frequency and dispersion characteristics of a mode of the resonator. The photonic resonator analyzer 220 and characterizing a photonic resonator can include an interrogator that can include a tunable laser, broadband light source, frequency comb, or a combination thereof. The interrogator measures a resonator response that can span a free spectral range (FSR). Photonic resonator analyzer 220 acquires spectra spanning multiple FSRs over multiple temperatures, pressure, or stimuli to characterize the stimuli-specific (e.g., temperature-specific) sensitivity of individual modes and a mode spacing (FSR) dependence on the stimuli. The stimuli (e.g., temperature) dependence of the mode frequency and dispersion uniquely identifies a mode number of the observed mode, providing matching calibration coefficients to the mode under observation.

Figure 1:
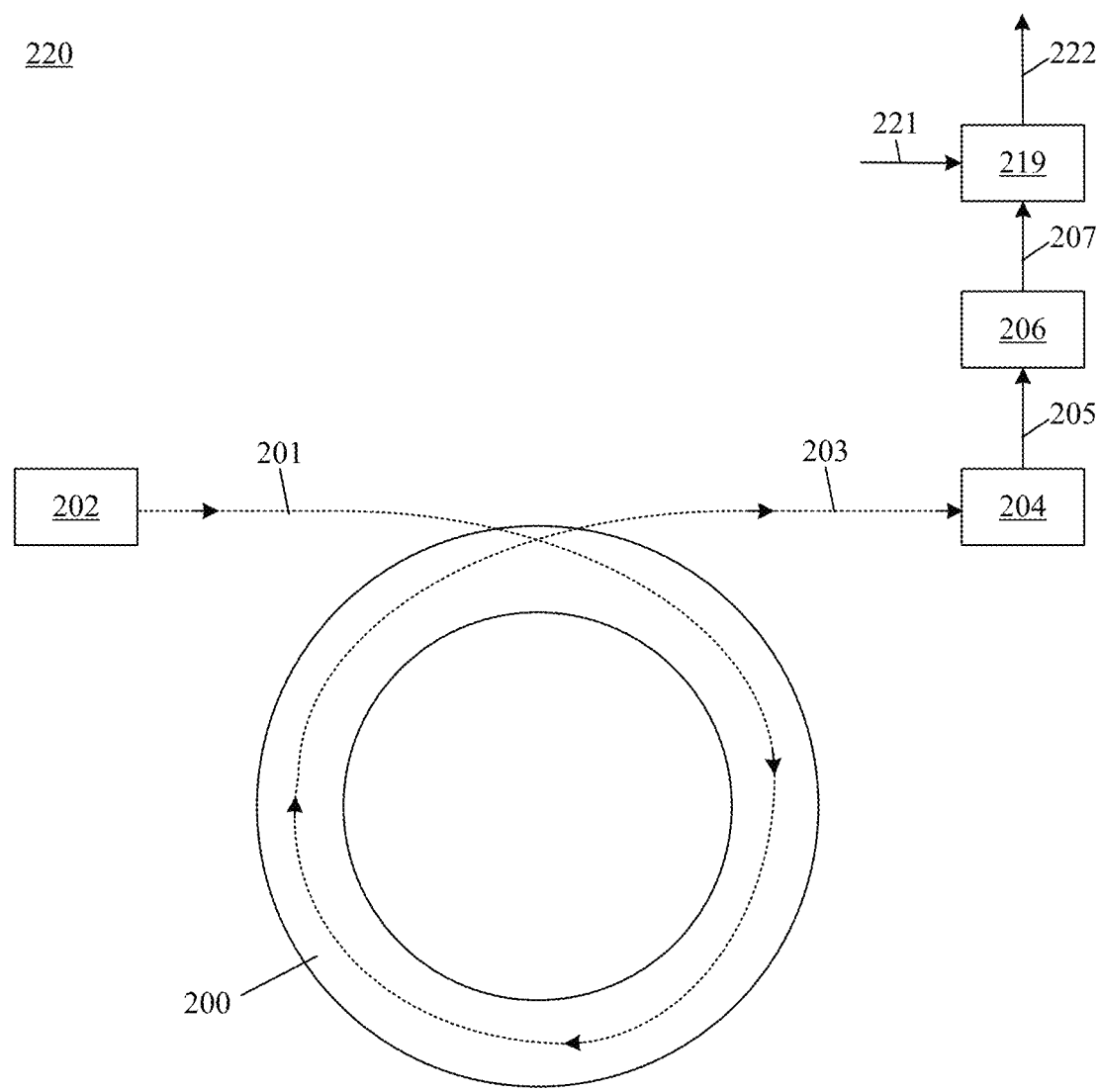
FIG. 1 shows a photonic resonator analyzer 220.

Photonic resonator analyzer 220 characterizes photonic resonator 200. In an embodiment, with reference to FIG. 1 and FIG. 2, photonic resonator analyzer 220 includes: light source 202 that provides probe light 201; photonic resonator 200 in optical communication with light source 202 and that receives probe light 201 from light source 202 and produces product light 203 from probe light 201: optical detector 204 in optical communication with photonic resonator 200 and that receives product light 203 from photonic resonator 200 and that produces product signal 205 from product light 203; mode analyzer 206 in communication with optical detector 204 and that receives product signal 205 from optical detector 204 and produces resonator spectrum 207 from product signal 205, resonator spectrum 207 including: a plurality of mode features 208, each mode feature 208 individually including: primary spline 211 including primary slope 215; secondary spline 212 including secondary slope 216; and mode peak 210 spectrally interposed between primary spline 211 and secondary spline 212; and modal width 213 that is a full width at half maximum of mode feature 208 from primary spline 211 to secondary spline 212, such that mode peaks 210 of adjacent mode features 208 are spectrally separated by mode distance 214 and spectrum valley 209; and spectral analyzer 219 in communication with mode analyzer 206 and that: receives resonator spectrum 207 from mode analyzer 206; analyzes resonator spectrum 207 by: producing modal kurtosis by normalizing primary slope 215 to secondary slope 216; and producing fringe visibility by normalizing mode peak 210 to modal width 213; and performs regression by: fitting non-parametric model 221 to resonator spectrum 207, wherein spectrum valley 209, mode peak 210, primary spline 211, secondary spline 212, modal width 213, mode distance 214, primary slope 215, secondary slope 216, and modal kurtosis are fitting parameters of non-parametric model 221; and produces thermal response function 222 of photonic resonator 200 from fitting non-parametric model 221 to resonator spectrum 207 to characterize the photonic resonator 200.

Components of photonic resonator analyzer 220 can be made from and include various materials. Photonic resonator 200 can includes a ring resonator, a concave disk resonator, a photonic waveguide, disk resonator, a microsphere resonator, a photonic crystal cavity, a photonic array, or a combination thereof. As such, photonic resonator 200 can be a fiber (e.g., fiber Bragg grating), strip, ring, disk, spherical structure, and the like that is disposed at a selected distance from a waveguide or other medium that communicates probe light 201 to photonic resonator 200. For a curved photonic resonator 200, a radius of photonic resonator 200 is selected so an effective length of a circumference is an integer of a resonant wavelength of photonic resonator 200. Various oscillators are described in U.S. Pat. No. 10,782,421, the disclosures of which is incorporated by reference in its entirety. Probe light 201 can have a frequency from 20 kilohertz (kHz) to 700 terahertz (THz), specifically from 1 gigahertz (GHz) to 500 THz, and more specifically from 500 GHz to 400 THz. Accordingly, photonic resonator 200 produces product light 203 that can have a frequency from 20 kilohertz (kHz) to 700 terahertz (THz), specifically from 1 gigahertz (GHz) to 500 THz, and more specifically from 500 GHz to 400 THz. Photonic resonator 200 has an arbitrary number m of modes by which resonances of photonic resonator 200 sustain standing electromagnetic modes in photonic resonator 200. Photonic resonator 200 can be made from and include various materials including optically transmissive medium such as quartz, silicon, and the like.

Optical detector 204 can include a photodiode, photomultiplier tube, and the like that receives product light 203 and transduces product signal 205 from product light 203. Product signal 205 can have a magnitude that provides an optical amount of product light 203. Moreover, optical detector 204 can be calibrated to provide a linear response or an absolute amount of product light 203.

Mode analyzer 206 receives product signal 205 from optical detector 204 and analyzes product signal 205 to produce resonator spectrum 207. Here, mode analyzer 206 can include hardware or software components that subject product signal 205 to analysis. Such components include analog to digital converter, microprocessor, data array tabulation software to create a lookup dictionary, and the like. Exemplary mode analyzers 206 includes a process such as a computer equipped with digitizer card and data tabulation software.

Figure 2:
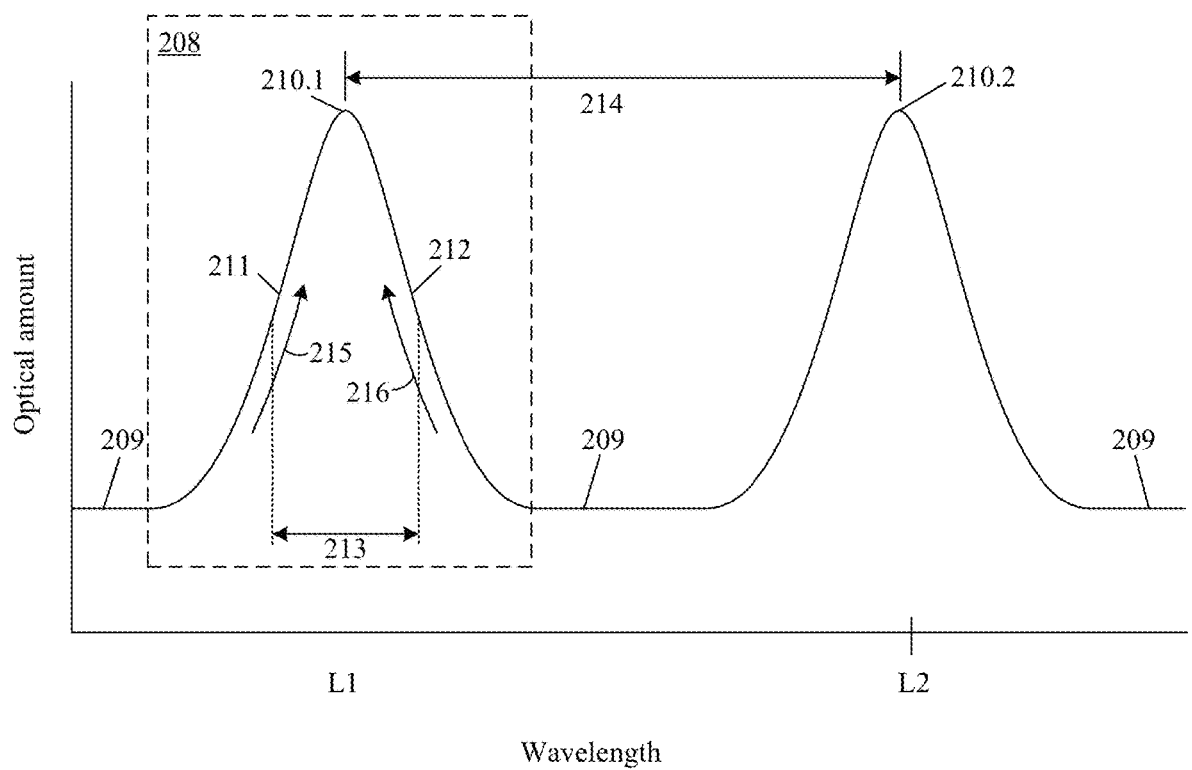
FIG. 2 shows a resonator spectrum 207.

With reference to FIG. 2, resonator spectrum 207 can be an optical amount of product light 203 as a function of wavelength such that resonator spectrum 207 includes a plurality of mode features 208. Each mode feature 208 corresponds to a mode of photonic resonator 200 and individually includes: primary spline 211 including primary slope 215; secondary spline 212 including secondary slope 216; and mode peak 210 spectrally interposed between primary spline 211 and secondary spline 212; and modal width 213 that is a full width at half maximum of mode feature 208 from primary spline 211 to secondary spline 212. Mode peaks 210 (e.g., mode peak 210.1, mode peak 210.2) of adjacent mode features 208 are spectrally separated by mode distance 214 and spectrum valley 209. It should be appreciated that there can be m number of mode peaks 210 in resonator spectrum 207. Further resonator spectrum 207 can be an absorption spectrum or transmission spectrum. Further resonator spectrum 207 can be a time-varying inverse Fourier transform signal containing the absorption or transmission spectrum.

Spectral analyzer 219 receives resonator spectrum 207 from mode analyzer 206 and analyzes resonator spectrum 207 to produce thermal response function 222 from non-parametric model 221 and resonator spectrum 207. Here, spectral analyzer 219 can include hardware or software components that subject resonator spectrum 207 to analysis based on non-parametric model 221. Such components include a microprocessor, data tabulation software, machine learning algorithm, and the like. Exemplary spectral analyzers 219 includes a computer running software configured to compute linear regression, ridge regression, lasso regression, Gaussian processes, deep neural networks, and the like. The analysis performed by spectral analyzer 219 on resonator spectrum 207 can include various operations including background subtraction, background correction, peak identification, or fitting, e.g., regression using an arbitrary function that includes selected fitting parameters such as non-parametric model 221. Spectral analyzer 219 uses labeled output, e.g., a spectrum produced by a known amount of stimuli, to determine 221. Subsequent 207 inputs for which amount of stimuli is unknown, 219 may use be used by 221 to modify the parameters of 221 or identify the mode number or infer the amount of stimuli.

Non-parametric model 221 is a fitting function that includes adjustable fitting parameters. The fitting parameters can include spectrum valley 209, the mode peak 210, primary spline 211, secondary spline 212, modal width 213, mode distance 214, primary slope 215, secondary slope 216, or modal kurtosis. Exemplary non-parametric model 221 includes $f(T,m)=a_m*peak+b_m*peak*peak+c_m*(time\ referenced\ kurtosis)+d_m*(time\ referenced\ width)$, where m is the mode number, $a_m$, $b_m$, $c_m$, $d_m$ are fitting parameters for $m^{th}$ mode.

A device specific model can be used, e.g., a model for a Bragg grating such as:

$$\frac{\lambda}{\lambda_0} = 1 + \left\{ 2n\alpha_L + 2\Lambda \frac{1}{n}\left[ -3k*\frac{n-1}{2} - \sum_j \frac{E_j G_j}{E_j^2 - E^2}*\left(E_g^o - \frac{\alpha_g T^2}{T+\beta}\right) \right] \right\}*(T-T_o)$$

wherein α is electron-phonon interaction term; β is related to a Debye temperature of the material; λ is Bragg wavelength at measurement condition, e.g., an unknown temperature; $\lambda_o$ is a Bragg wavelength at the reference temperature, e.g., 20° C.; Λ is grating period; $\alpha_L$ is the thermal expansion coefficient; $E_j$ is the energy of the $j^{th}$ state, $G_j$ is a dispersion parameter associated with the $j^{th}$ state; T is the temperature; n is the refractive index; E is the energy of the photon; and j is the number of states considered and is an adjustable real number greater than zero and typically less than ten Thermal response function 222 is a relation between temperature, wavelength, and mode number for photonic resonator 200. The relation can be data represented as a graph, table, order tuple, and the like or a mathematical function with functional inputs that include temperature or wavelength and has functional output of mode, or mode can be provided to thermal response function 222 to obtain wavelength or temperature.

Photonic resonator analyzer 220 can be made in various ways. Photonic resonator analyzer 220 includes a number of optical and electrical components, wherein such components can be interconnected and placed in communication (e.g., optical communication, electrical communication, and the like) by physical or free-space interconnects. The components can be disposed on mounts that can be disposed on a bulkhead for alignment and physical compartmentalization. As a result, photonic resonator analyzer 220 can be disposed in a terrestrial environment, space environment, biological environment, manufacturing environment, and the like.

In an embodiment, a process for making photonic resonator analyzer 220 includes: providing light source 202; connecting photonic resonator 200 to light source 202 by pig tailing a fiber optic to a coupling waveguide using either butt coupling, grating couplers or evanescent coupling. A coupling waveguide can be disposed within 100 nm to 100 micrometer of the resonator. In an embodiment, the resonator is fabricated within the coupling waveguide. The product light from the resonator is coupled back into a coupling waveguide which communicates the product light to a fiber optic. The process can include connecting optical detector 204 to photonic resonator 200 by a fiber optic; connecting mode analyzer 206 to optical detector 204 by a coaxial or serial cable; and connecting spectral analyzer 219 to mode analyzer 206 by an electrical communication waveguide, e.g., a cable. The light source 202 can include a tunable laser, and a wavelength of light can be swept over a range of wavelength equaling multiple FSR. A small amount of 201 can be diverted to a frequency reference e.g. wavemeter by using an optical splitter. The wavemeter provide accurate measurements of laser wavelength which is communicated via a serial or USB connection to 206.

The process for making photonic resonator analyzer 220 also can include interposing an optical splitter between 202 and 200. The optical splitter delivers a part of probe light 201 to optical detector 204, wherein product light 203 and probe light 201 are beat against each other on a fast photoreceiver to generate a beat note. Light source 202 may be a frequency comb. In an embodiment, heterodyne readout techniques laser locking, e.g., Pound-Drever-Hall or dither locking, are used. For this purpose, a laser is locked to a known frequency source such a molecular gas (acetylene). The output of frequency stabilized laser can be communicated to a phase adjustment apparatus e.g. delay line or acousto-optic modulator followed by communication to optical detector 204. A second laser, in communication with photonic resonator 200 is swept over a wide range of wavelengths spanning two or more FSR. In an embodiment, a wide bandwidth light source such a super luminescent diode (SLD) may be used. Here, light output from a SLD is coupled to photonic resonator 200 and product light 203 is communicated to optical detector 204 where it beats against the reference light generated. Reference light may be a frequency comb or a tunable laser. Using mode analyzer 206, output signal 205 is plotted against laser wavelength measurement to construct a resonator spectra. Standard peak finding algorithms are then used to find regions where spectral features are located. The resonator spectra is fitted to a cubic spline or gaussian function and mode characteristics such as peak, kurtosis, width and FSR are calculated. From these parameters, state-referenced features are calculated by taking the values of each feature at 20° C. recorded at the first instance of 200 is measured. All of these features and known temperature values associated with those measurements are provided as input in regression model where regularization is used to auto select the most import features and a linear non-parametric model, or non-linear model (deep neural network) is trained on the data to generate a model representation of the photonic resonator 200. The model can be used to infer temperature of the resonator from its spectra. The use of long short term memory algorithms in constructing the model can allow the use of future spectral inputs of known temperature to adjust the model's parameters to compensate for drift.

Photonic resonator analyzer 220 and processes herein have numerous advantageous and unexpected benefits and uses. In an embodiment, a process for characterizing a photonic resonator includes providing photonic resonator 200; communicating probe light 201 from light source 202 by a fiber optic; receiving, by photonic resonator 200, probe light 201 by evanescent coupling between a coupling waveguide and photonic resonator 200; producing, by photonic resonator 200, product light 203 from probe light 201 by evanescent coupling standing modes of photonic resonator 200 into a coupling waveguide in communication with a fiber optic; communicating product light 203 from photonic resonator 200 to optical detector 204 by evanescent coupling from photonic resonator 200 to a coupling waveguide; receiving, by optical detector 204, product light 203 by a fiber optic; producing, by optical detector 204, product signal 205 by converting optical power into an electrical signal; communicating product signal 205 from optical detector 204 to mode analyzer 206 by a coaxial or serial cable; receiving, by mode analyzer 206, product signal 205 by a coaxial or serial cable; producing, by mode analyzer 206, resonator spectrum 207 from product signal 205 by collating wavelength and photocurrent data into a dictionary, resonator spectrum 207 including: a plurality of mode features 208, each mode feature 208 individually including: primary spline 211 including primary slope 215; secondary spline 212 including secondary slope 216; and mode peak 210 spectrally interposed between primary spline 211 and secondary spline 212; and modal width 213 that is a full width at half maximum of mode feature 208 from primary spline 211 to secondary spline 212, such that mode peaks 210 of adjacent mode features 208 are spectrally separated by mode distance 214 and spectrum valley 209; analyzing resonator spectrum 207 by: producing modal kurtosis by normalizing primary slope 215 to secondary slope 216 by peak fitting to identify regions of interest, fitting a cubic spline over the region, solving for roots to determine width, using the half-width to determine peak wavelength, using peak wavelength to determine height and ratio of area under the primary and secondary spline to determine kurtosis; producing fringe visibility by normalizing the product of height squared and mode peak 210 to modal width 213 by setting up a new data array where pairwise computed values are stored; and performing regression by: fitting non-parametric model 221 to resonator spectrum 207 by using machine learning algorithm, wherein spectrum valley 209, mode peak 210, primary spline 211, secondary spline 212, modal width 213, mode distance 214, primary slope 215, secondary slope 216, and modal kurtosis are fitting parameters of non-parametric model 221; and determining thermal response function 222 of photonic resonator 200 from fitting non-parametric model 221 to resonator spectrum 207 to characterize photonic resonator 200 by using gradient descent to train and validate the 221.

Additional steps can be performed in characterizing a photonic resonator. Such steps can include using regularization to auto-select parameters fitting parameters and measuring changes in fitting parameters due to change in polarization of light 201.

Photonic resonator analyzer 220 and characterizing a photonic resonator use a mode frequency (v), mode-to-mode separation (FSRmn), and their respective dependence on a thermo-physical perturbation (e.g., temperature) to uniquely identify each mode of photonic resonator 200. Photonic resonator 200 can be a nanophotonic thermometer such as a whispering gallery mode resonator that can be a disk resonator or ring resonator. Resonator spectrum 207 from photonic resonator 200 can be described by the equation:

$$m\lambda_m = 2\pi r n_g,$$

wherein $n_g$ is a group index; $\lambda_m$ is a resonance wavelength of $m^{th}$ mode; and r is resonator radius; and m is a particular mode of photonic resonator 200. Group index $n_g$ is given by:

$$n_g = \left(n_{eff} - \lambda_m\left(\frac{\partial n_{eff}}{\partial \lambda_m}\right)\right)$$

wherein $n_{eff}$ is the effective index of the mode; $\lambda_m$ is the wavelength of the mth mode, n is refractive index; and $\partial n/\partial \lambda$ is a change in refractive index with photon wavelength. The temperature dependence of photonic resonator 200 is given by:

$$\frac{\partial \lambda}{\partial T} = \left[2\pi r\left(\frac{\partial n_{eff}}{\partial T}\right) + 2\pi n_{eff}\left(\frac{\partial r}{\partial T}\right)\right] - \lambda_o\left(\frac{\partial}{\partial T}\frac{\partial n}{\partial \lambda}\right),$$

wherein $\partial \lambda/\partial T$ is temperature sensitivity of the mode frequency; r is $\partial n_{eff}/\partial T$ is thermo-optic coefficient and can be modeled as $$\left\{2n\alpha_L + 2\Lambda\frac{1}{n}\left[-3\alpha_L * \frac{n-1}{2} - \sum_j \frac{E_j G_j}{E_j^2 - E^2} * \left(E_g^o - \frac{\alpha_g T^2}{T+\beta}\right)\right]\right\}$$

or as empirically fitted polynomial equation; and $\partial r/\partial T$ is a thermal linear expansion of the resonator.

Figure 3:
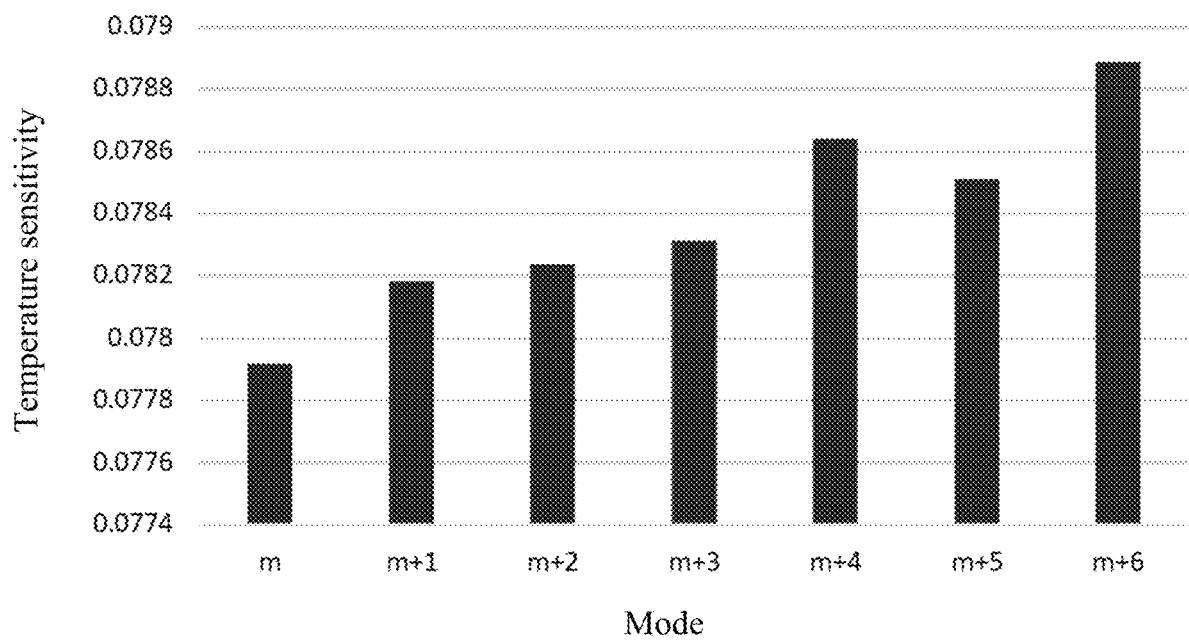
FIG. 3 shows a graph of temperature sensitivity versus mode for mode m to (m+4)
Figure 4:
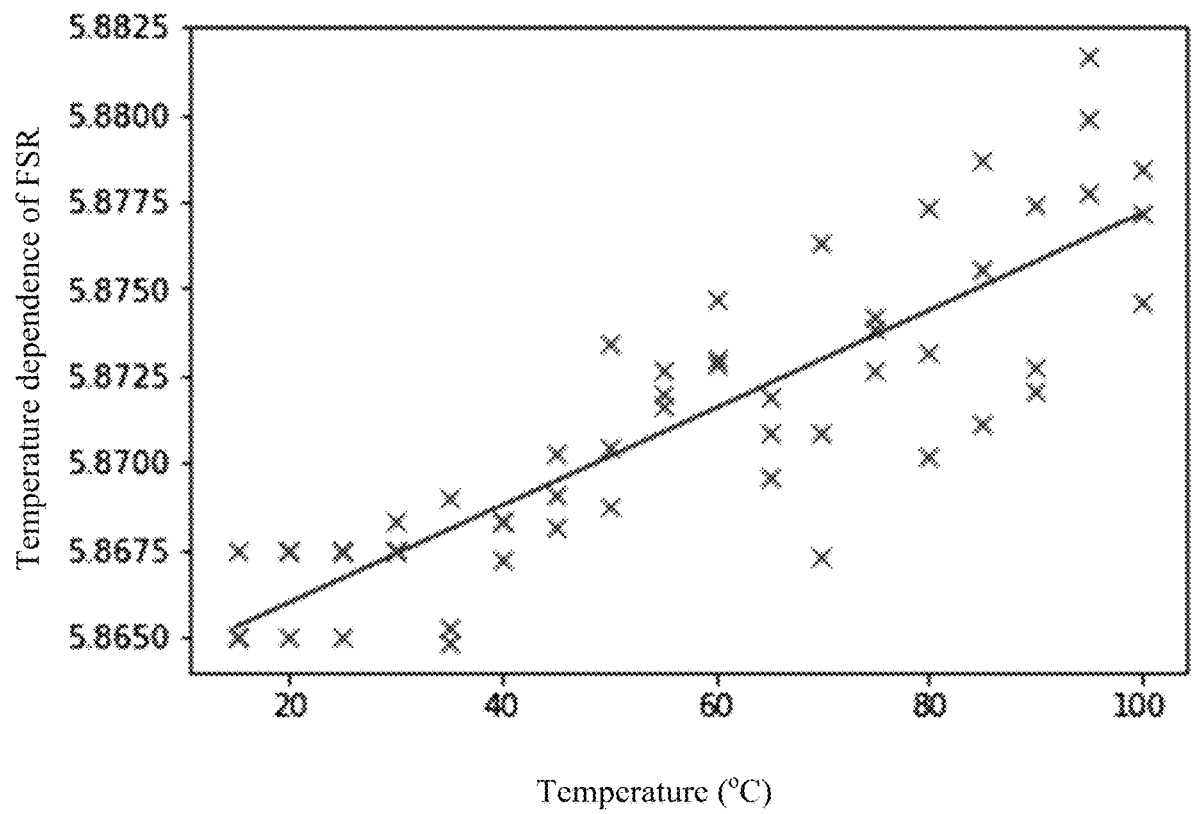
FIG. 4 shows a graph of temperature sensitivity versus mode for a temperature dependence of FSR between mode m and (m+4) (0.0001 nm/K)
Figure 5:
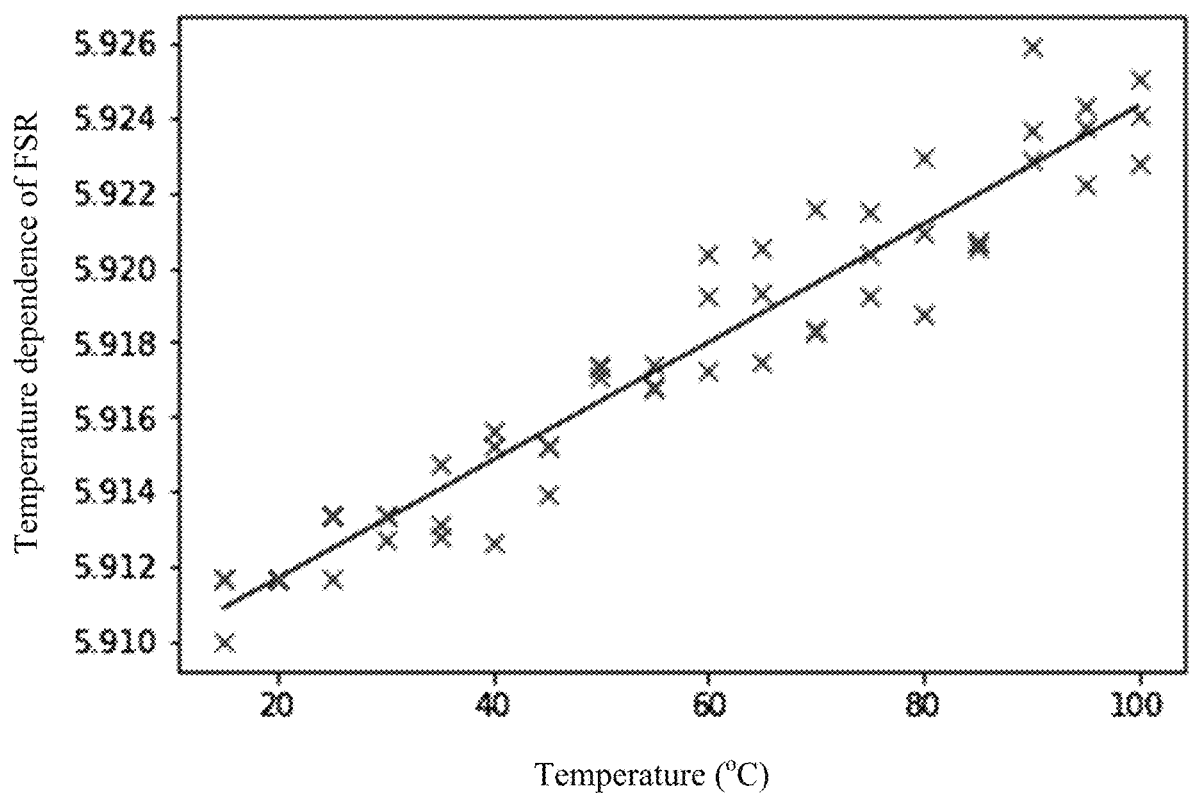
FIG. 5 shows a graph of temperature sensitivity versus mode for a temperature dependence of FSR between mode m and (m+6) (0.00016 nm/K)

The first term on the right-hand side independently can be considered since that term can be 100 times greater than the second term and can be orders of magnitude greater than the third term. In certain measurements, the second and third terms can contribute a non-negligible quantity. A calibration of non-parametric model 221 for photonic resonator 200 resonator spectrum 207 can be fit to measured data of resonator spectrum 207 can provide these smaller contributions. If all modes of photonic resonator 200 occupy the same volume, then the temperature dependence of all such modes are similar. Higher-order modes can be located closer to an edge of photonic resonator 200 than a lower-order mode. Without wishing to be bound by theory, it is believed that if modes sample different amounts of different materials of photonic resonator 200 (e.g., if mode m+1 samples a slightly greater volume of silicon oxide cladding than an m-th mode), modes have proportional differences in $n_{eff}$ and dispersion. Respective dependencies of mode frequency and FSR on temperature vary systematically from mode to mode and are used to identify modes. Measurements of product light 203 from of a silicon ring resonator as photonic resonator 200 had each successive mode with higher temperature sensitivity as shown in FIG. 3 and FIG. 4.

In photonic resonator 200, a single mode is identified by a selected characteristic, such as high Q or a mode frequency. The single mode's frequency is measured as a function of measurand to create a calibration plot. Characterizing a photonic resonator can include, at some known state such as temperature or pressure, locating the mode and following the mode as the measurand is slowly changed. The measurand can include a temperature, pressure, radiation, humidity and the like. Further, the process can include a broadband light source. For a change that is continuous, mode dispersion can be linear or about zero, wherein a mode can be selected by progressively moving up or down modes, counting modes to track frequency change to measurand. Advantageously, the initial state can be independently known. Photonic resonator 200 and characterizing a photonic resonator provides identification of the modes available for photonic resonator 200 and application of calibration coefficient in an absence of a broadband light source or an independent measurement device. Moreover, photonic resonator 200 and characterizing a photonic resonator allows use of lower size, weight and power (SWAP) value lasers in lieu of expensive lasers that provides a reduction in instrument cost.

It should be appreciated that photonic resonator analyzer 220 and characterizing a photonic resonator can be used to measure the spectra of photonic resonator 200 in response to a wide variety stimuli. Different stimuli, e.g., temperature or pressure interact with photonic resonator 200 in unique ways that are in part dependent on the exact geometry, material composition and defects of both in photonic resonator 200. The interaction of device geometry, material composition and defects with stimuli alter the underlying physics of photonic resonator 200 in ways that leave tell-tale signatures in the spectra, e.g., changes in the cladding layer can exert stress on photonic resonator 200, resulting in slight geometric distortion that manifest themselves as changes in FSR and peak. These small but significant changes in the spectral characteristics include changes to the composition of mode features. These changes can be reliably ascertained by measuring the spectra spanning multiple FSR, allowing for determination of relative changes between modes providing a useful internal standard. Using such self-normalized measurements provides multi-dimensional data set with each feature representing a different aspect related to the physics of the device e.g. the width is a proxy for coupling coefficient between the coupling waveguide and photonic resonator 200. It should be appreciated that calibration models of sensors based on conventional interrogators correlate peak to an amount of stimuli. Using photonic resonator 200, multiple, non-colinear parameters were extracted that show negative and positive correlations on the amount of stimuli. Using a detailed dictionary, assembled using an exemplary set of data acquired under known amounts of stimuli, non-parametric model 221 identified spectral characteristic unique to each mode.

Figure 8:
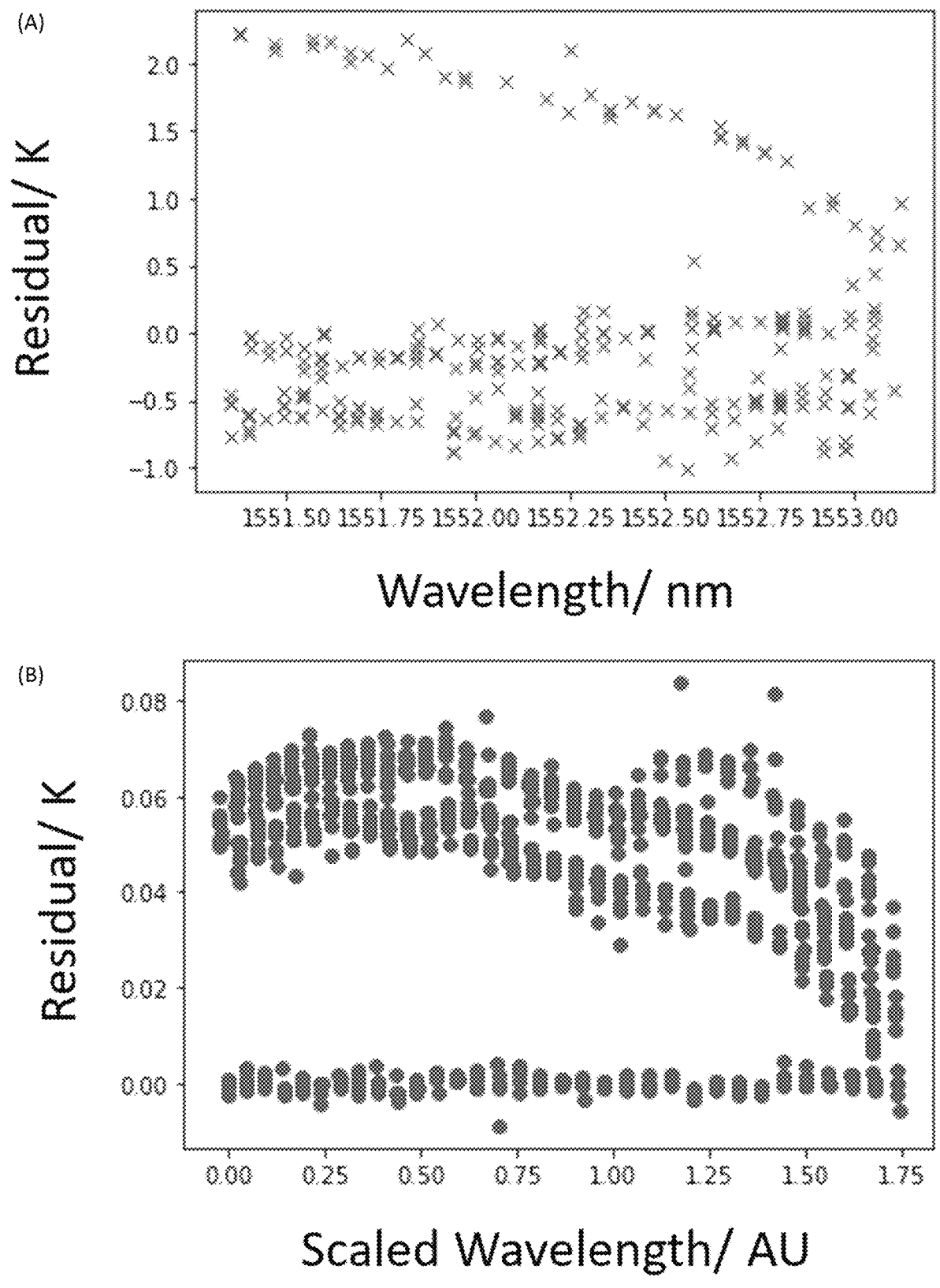
FIG. 8 shows (A) a time series temperature response of a FBG is fitted to a simple linear regression model that calculates the relationship between peak center and temperature, wherein the Y-axis is a difference is measured temperature and predicted temperature from the linear model; (B) shows a time series temperature response of a FBG that is fitted to a simple linear regression model that calculates the relationship between peak center, state normalized (width, kurtosis and amplitude) and temperature, wherein the Y-axis is a difference is measured temperature and predicted temperature from the linear model.

Photonic resonator analyzer 220 and processes disclosed herein have numerous beneficial uses, including the ability to uniquely identify a mode number of a resonance of photonic resonator 200 at any condition. The ability to identify mode number under arbitrary conditions has the benefit of eliminating the need for one or both of a check thermometer and a temperature control bath for recreating a known condition which could be compared to previously measured standard condition to identify the mode. Advantageously, photonic resonator analyzer 220 and characterizing a photonic resonator overcome limitations of technical deficiencies of conventional compositions that can require users to identify the mode number by taking measurements under known conditions, allowing the user to identify the mode for which a calibration model was developed using its resonance wavelength ($\lambda_o$). Using photonic resonator analyzer 220, one analyzes response of photonic resonator 200 over a small arbitrary range of stimuli and uses the non-parametric model 221 to identify the mode number and chose appropriate parameters of non-parametric model 221 for use in the calibration model. As such, the user employs small, inexpensive lasers with narrower tuning ranges, e.g., distributed feedback lasers in lieu of widely tunable lasers, and can mode hop across different modes whilst using appropriate model parameters. FIG. 8 shows exemplary data and fitting.

Photonic resonator analyzer 220 and processes herein unexpectedly reduce measurement error due to long-term drift in photonic resonators. Conventional devices allow the measurement of a single parameter such as a peak. Changes in peak are measured as a function of changes in stimuli and a calibration model is developed using standard linear regression techniques. Photonic resonator analyzer 220 provides multiple parameters, many of whom are non-colinear with each other, and representative of different aspects of the device physics, as the calibration models built using the complete set of parameters allows us to capture reversible and irreversible changes in device physics and chemistry. The resulting models allow for corrections of small errors, e.g. apparent shift in peak due to width broadening. Accounting for such changes leads to a 2-10 fold reduction in validation error when inference is made with photonic resonator 200.

The articles and processes herein are illustrated further by the following Example, which is non-limiting.

EXAMPLE

Mode Inter-Changeability in Photonic Thermometer

Nano-photonics can provide an ultra-stable photonic temperature sensor that replace resistance thermometry. A temperature dependence of a photonic resonator's mode frequency is used to measure temperature. Following the same mode over a large temperature range can involve a tunable laser. Adjacent modes of a silicon ring resonator can be treated as being inter-changeable because temperature sensitivities of nearby modes, though very close in magnitude, are statistically different. For certain resonators, the difference in temperature sensitivity between the mode at position m and m+4 amounts to an error of 2.4 mK to 17.7 mK at room temperature. Over a 325 K interval, this error can result in a temperature measurement error of 0.77 K to 5 K.

Temperature measurements are used in manufacturing process control, physiological monitoring, environmental monitoring, and the like. Conventional thermometer technology includes resistance measurement of a thin metal film or wire. Resistance thermometers can measure temperature with uncertainties of 100 mK to 10 mK and are sensitive to humidity, chemical oxidation, and mechanical shock that causes resistance of the conventional thermometer to change over time that can be subject to frequent off-line, expensive, and time-consuming calibration that adds to the cost of sensor maintenance. The photonic resonator described here overcomes these technical deficiencies of conventional resistance thermometry.

The photonic resonator is a photonic temperature sensor that exploits temperature-dependent change in material properties of the photonic resonator. These properties include a thermo-optic effect, thermal expansion, and the like. Fiber Bragg gratings (FBG) exhibit temperature-dependent shifts in resonant Bragg wavelength of≈10 pm/K in dry, strain-free environments and can measure temperature with uncertainties of 500 mK (k=2) from 233 K to 293 K. Silicon-on-insulator devices such as Bragg waveguides, ring resonators, and photonic crystal cavities have a superior thermo-optic coefficient that provide temperature sensitivity of 60 pm/K to 80 pm/K. Humidity effect on silicon photonic devices can be mitigated by passivating silicon dioxide layer on top of the device. Silicon photonic thermometers can measure temperature with sub-mK resolution.

This Example provides information for temperature-dependence of up to seven adjacent modes of a silicon ring resonator across three different chips drawn from the same fabrication run. The device include a Si straight-probe waveguide with cross-sections of 510 nm by 220 nm, evanescently coupled to a 15 μm diameter ring over an air gap of 130 nm and covered with a 1.5 μm thick layer of plasma-enhanced chemical vapor deposition (PECVD) $SiO_2$. The silicon photonic sensors were made using CMOS manufacturing technology.

The device is probed using a C-band laser that was swept over the sensor resonance. Ten percent of laser power was picked up from the laser output for wavelength monitoring, and the rest of the laser power, after passing through polarization paddles, was injected into the photonic device and detected by a power meter. Light from single mode fiber was coupled into and out of the waveguide by grating couplers. Some experiments were performed with≈100 nW of incident laser power.

Figure 6:
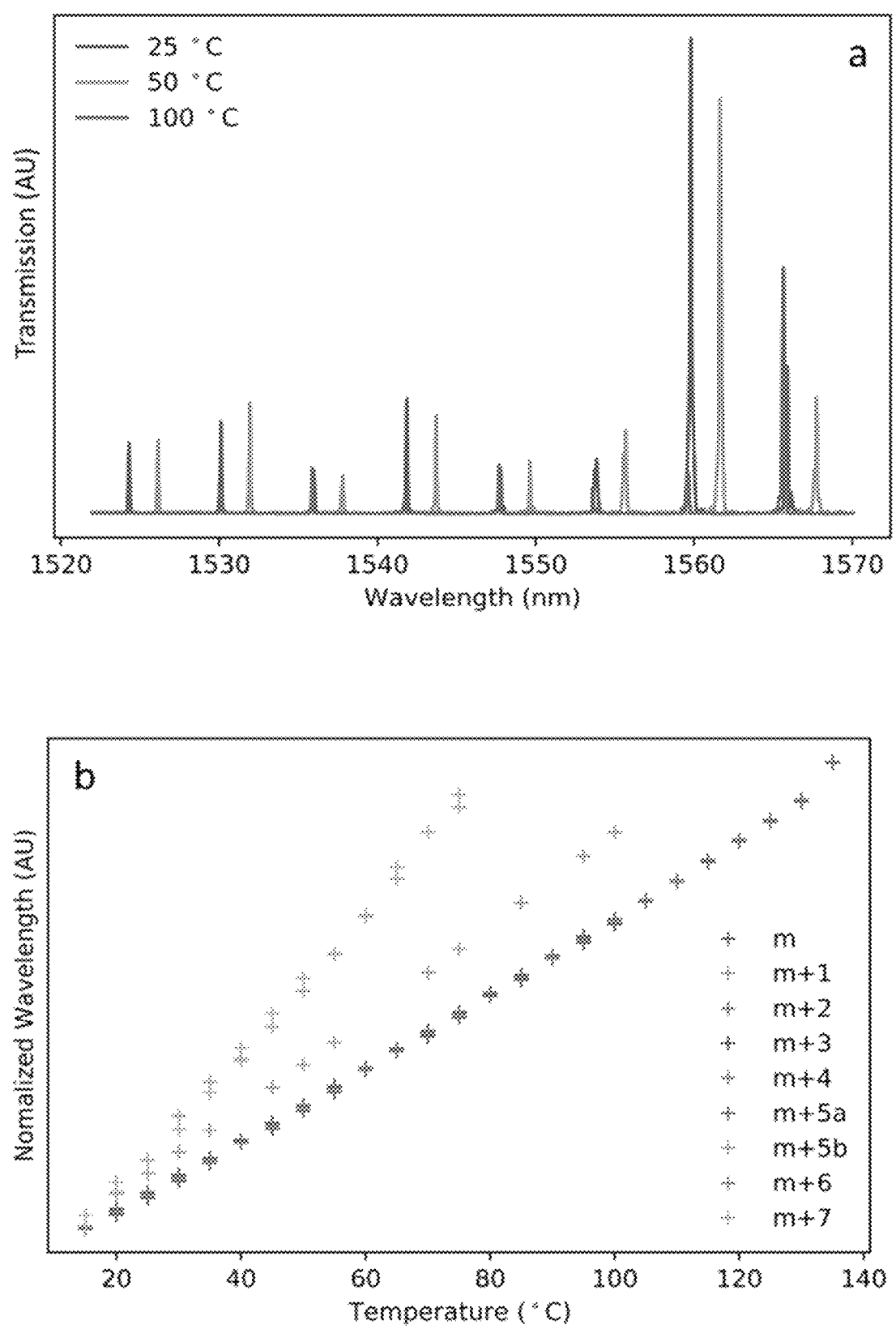

As shown in FIG. 6a, at 20° C., over the range of 1520 nm to 1570 nm the spectra shows seven resonances, located at 1522.30828 nm, 1528.10100 nm, 1533.95890 nm, 1539.84587 nm, 1545.75360 nm, 1551.76479 nm, 1557.75820 nm and 1561.4100 nm separated by FSR of≈5.79 nm. As temperature increased, the highest wavelength mode, mode 7, shifted out of the laser scanning window, and new modes (m−1, m−2) appeared. Mode m+7, m−1, and m−2 over limited temperatures were considered in analysis.

Figure 7:
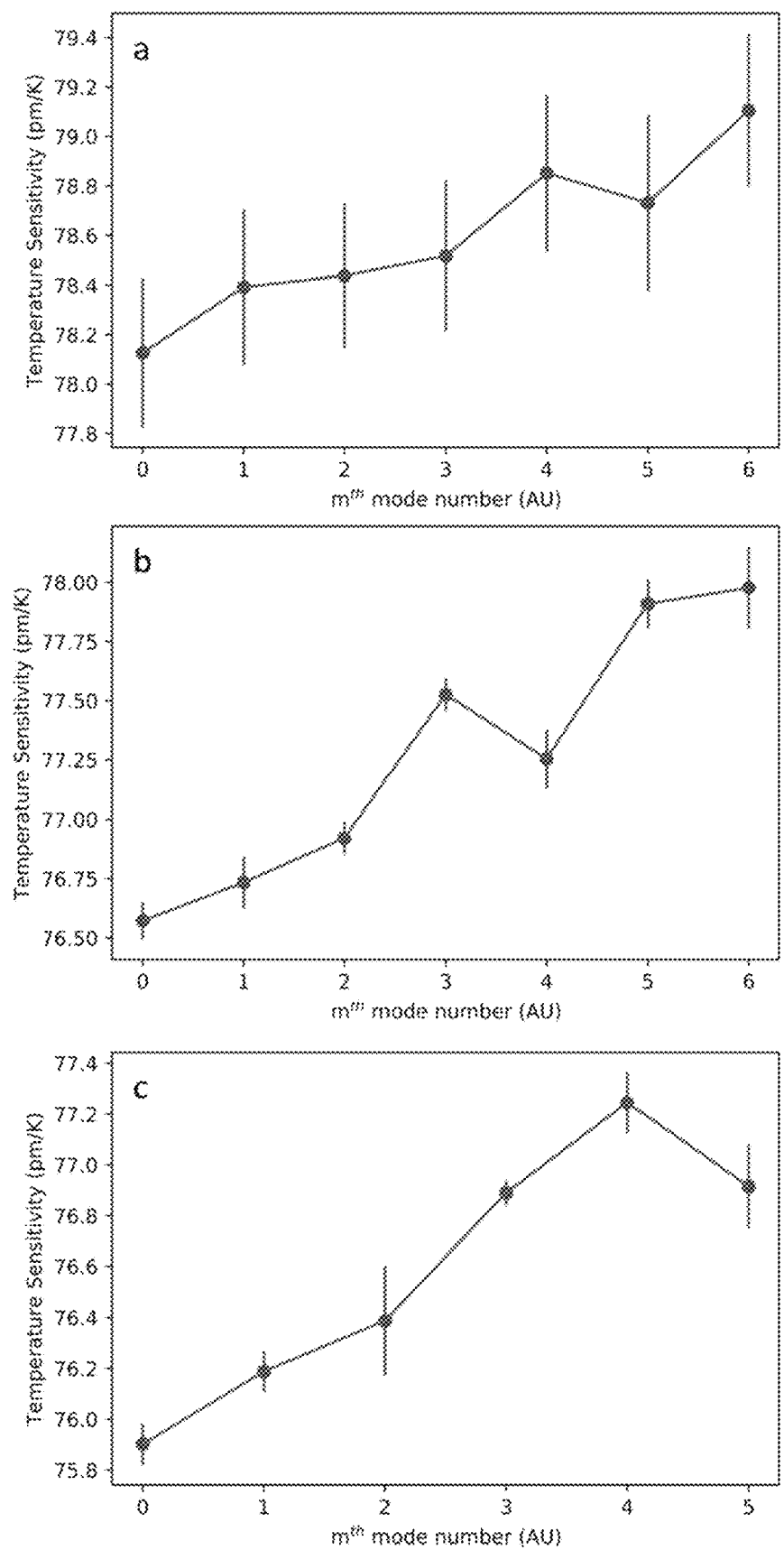
FIG. 7 shows a temperature sensitivity of each mode for three different photonic resonators in panels A, B, and C, respectively, wherein temperature sensitivities have statistically significant variances between different modes for the three photonic resonators.

Temperature-dependent shifts in the mode resonances have similar profiles with linear fit slopes of≈78 μm/K (FIG. 6b). Temperature-dependence of silicon ring resonators' different modes is weakly quadratic. Temperature-dependence of modes were subjected to linear fits of each mode. As shown in FIG. 7, the temperature sensitivities trended towards increasing temperature sensitivity with mode number. Uncertainty of fits were determined by a leave-one-out bootstrap analysis with fit uncertainty of approximately 0.12%. The first two modes (mode m and m+1) had statistically similar slopes. Higher-order modes, e.g. m+4 or greater, had statistical differences from the $m^{th}$ mode. The three samples had from 0.2% to 2% change in temperature sensitivity per mode hop. Between modes m and m+4 the percentage corresponded to a measurement error of 2.4 mK, 8.93 mK, and 17.7 mK for individual devices. When applying calibration of mode m to m+4, the change in temperature sensitivity had measurement uncertainty. Over the tuning range of the laser, equivalent to a 325 K temperature range, the measurement error was 770 mK (device A, FIG. 7a) and up to 5 K (device C, FIG. 7c).

For certain measurements, the combined uncertainty should be 10 mK or lower. Resistance thermometers such as platinum resistance thermometers (PRT) are interchangeable to within 100 mK-400 mK over a 300 K range. Results here show that, for photonic devices, mode inter-changeability can provide measurement performance of a Grade B PRT. The mode number dependence of the temperature sensitivity can be due to cross-term interaction between dispersion and thermo-optic coefficient, inter-mode mixing or other mode structure deviations from ideal transverse electric (TE) mode due to fabrication errors and limitations such as sidewall roughness and sloping. There is a need for in-depth analysis modal dispersion and mode structure. The impact of fabrication errors and waveguide geometry on mode structure and its evolution with temperature should be understood. Precise characterization of propagating mode families and their interactions across the temperature range provide design, fabrication, and selection of devices where mode inter-changeability can be employed as low-cost laser interrogators.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity). The conjunction "or" is used to link objects of a list or alternatives and is not disjunctive; rather the elements can be used separately or can be combined together under appropriate circumstances.

What is claimed is:

1. A photonic resonator analyzer for characterizing a photonic resonator, the photonic resonator analyzer comprising:

a light source that provides a probe light;
a photonic resonator in optical communication with the light source and that receives the probe light from the light source and produces product light from the probe light;
an optical detector in optical communication with the photonic resonator and that receives the product light from the photonic resonator and that produces a product signal from the product light;
a mode analyzer in communication with the optical detector and that receives the product signal from the optical detector and produces a resonator spectrum from the product signal, the resonator spectrum comprising:
　a plurality of mode features, each mode feature individually comprising:
　　a primary spline comprising a primary slope;
　　a secondary spline comprising a secondary slope; and
　　a mode peak spectrally interposed between the primary spline and the secondary spline; and
　　a modal width that is a full width at half maximum of the mode feature from the primary spline to the secondary spline,
　　such that mode peaks of adjacent mode features are spectrally separated by a mode distance and a spectrum valley; and
a spectral analyzer in communication with the mode analyzer and that:
　receives the resonator spectrum from the mode analyzer,
　analyzes the resonator spectrum by:
　　producing a modal kurtosis by normalizing the primary slope to the secondary slope; and
　　producing a fringe visibility by normalizing the mode peak to the modal width; and
　performs regression by:
　　fitting a non-parametric model to the resonator spectrum, wherein the spectrum valley, the mode peak, primary spline, secondary spline, modal width, mode distance, primary slope, secondary slope, and modal kurtosis are fitting parameters of the non-parametric model; and
　　produces a thermal response function of the photonic resonator from fitting the non-parametric model to the resonator spectrum to characterize the photonic resonator.

2. A process for characterizing a photonic resonator, the process comprising:
　providing a photonic resonator;
　communicating a probe light from a light source;
　receiving, by the photonic resonator, the probe light;
　producing, by the photonic resonator, a product light from the probe light;
　communicating the product light from the photonic resonator to an optical detector;
　receiving, by the optical detector, the product light;
　producing, by the optical detector, a product signal;
　communicating the product signal from the optical detector to a mode analyzer;
　receiving, by the mode analyzer, the product signal;
　producing, by the mode analyzer, a resonator spectrum from the product signal, the resonator spectrum comprising:
　　a plurality of mode features, each mode feature individually comprising:
　　　a primary spline comprising a primary slope;
　　　a secondary spline comprising a secondary slope; and
　　　a mode peak spectrally interposed between the primary spline and the secondary spline; and
　　　a modal width that is a full width at half maximum of the mode feature from the primary spline to the secondary spline,
　　　such that mode peaks of adjacent mode features are spectrally separated by a mode distance and a spectrum valley;
　analyzing the resonator spectrum by:
　　producing a modal kurtosis by normalizing the primary slope to the secondary slope;
　　producing a fringe visibility by normalizing the mode peak to the modal width; and
　performing regression by:
　　fitting a non-parametric model to the resonator spectrum, wherein the spectrum valley, the mode peak, primary spline, secondary spline, modal width, mode distance, primary slope, secondary slope, and modal kurtosis are fitting parameters of the non-parametric model; and
　　determining a thermal response function of the photonic resonator from fitting the non-parametric model to the resonator spectrum to characterize the photonic resonator.

\* \* \* \* \*